US005228537A

United States Patent [19]

Pfleger et al.

[11] Patent Number: 5,228,537

[45] Date of Patent: Jul. 20, 1993

[54] SAFETY MECHANISM FOR A VERTICAL RECIPROCATING CONVEYOR

[75] Inventors: Robert H. Pfleger, Milwaukee; Gene M. Barth, West Bend, both of Wis.

[73] Assignee: Pflow Industries Inc., Milwaukee, Wis.

[21] Appl. No.: 866,145

[22] Filed: Apr. 9, 1992

[51] Int. Cl.[5] .............................................. B60S 13/00

[52] U.S. Cl. ....................................... 187/8.5; 187/75; 187/106

[58] Field of Search ............... 187/9 R, 9 E, 8.5, 8.49, 187/106, 34, 32, 73, 75, 76; 254/89 R, 89 H

[56] References Cited

U.S. PATENT DOCUMENTS

| | | | |
|---|---|---|---|
| 2,589,329 | 3/1952 | Borovec | 187/106 |
| 3,088,546 | 5/1963 | Ross et al. | 187/8.49 |
| 4,023,649 | 5/1977 | Wood | 187/8.49 |
| 4,438,831 | 3/1984 | Rohanna | 187/106 |

OTHER PUBLICATIONS

Pflow Industries Inc. "Vertical Handling Material".

*Primary Examiner*—Robert P. Olszewski
*Assistant Examiner*—Kenneth Noland
*Attorney, Agent, or Firm*—Andrus, Sceales, Starke & Sawall

[57] ABSTRACT

A vertical reciprocating conveyor having a safety mechanism for automatically locking the conveyor at an elevated level. The conveyor comprises a cargo-supporting carriage which is guided for movement between a lower level and an upper level on a supporting structure. A drive mechanism which can take the form of a hydraulic cylinder unit is operably connected to the carriage and moves the carriage from the lower to the upper level. As the carriage moves upwardly, it travels slightly beyond the upper level to a third higher location where the carriage engages a limit switch which acts to discontinue operation of the hydraulic system, enabling the carriage to lower by gravity. At this third location, a pair of locking bars that are pivoted to the sides of the carriage, are moved toward a locking position so that as the carriage moves downwardly, the locking bars engage ledges on the supporting structure thereby locking the carriage at the upper level. To move the carriage from the upper level back to the lower level, the cylinder unit is actuated causing the carriage to move upwardly from the upper level to the third higher location. At the third location, the limit switch is actuated to terminate operation of the hydraulic system, enabling the carriage to move downwardly and simultaneously the locking bars are moved to the release position, so that the carriage can move downwardly through the upper level back to the lower level.

26 Claims, 4 Drawing Sheets

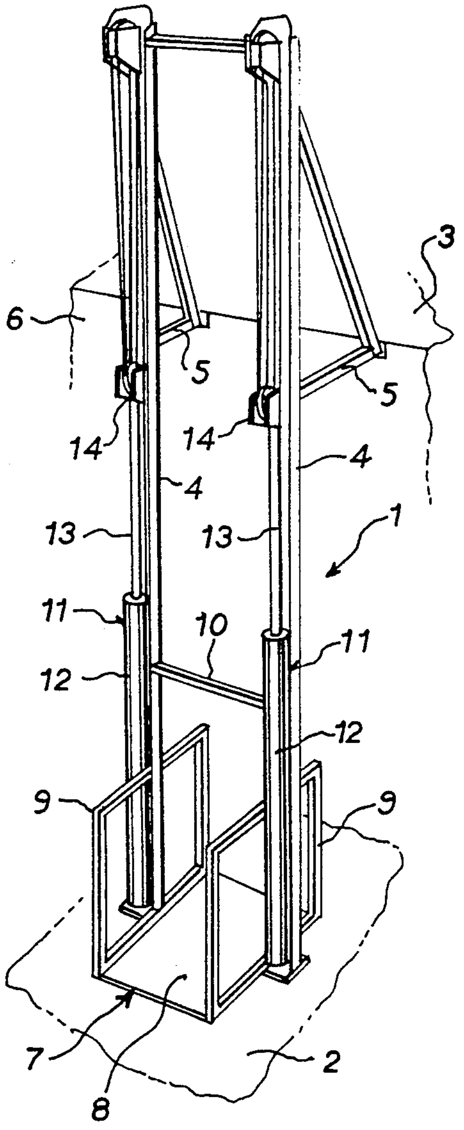
FIG. 1
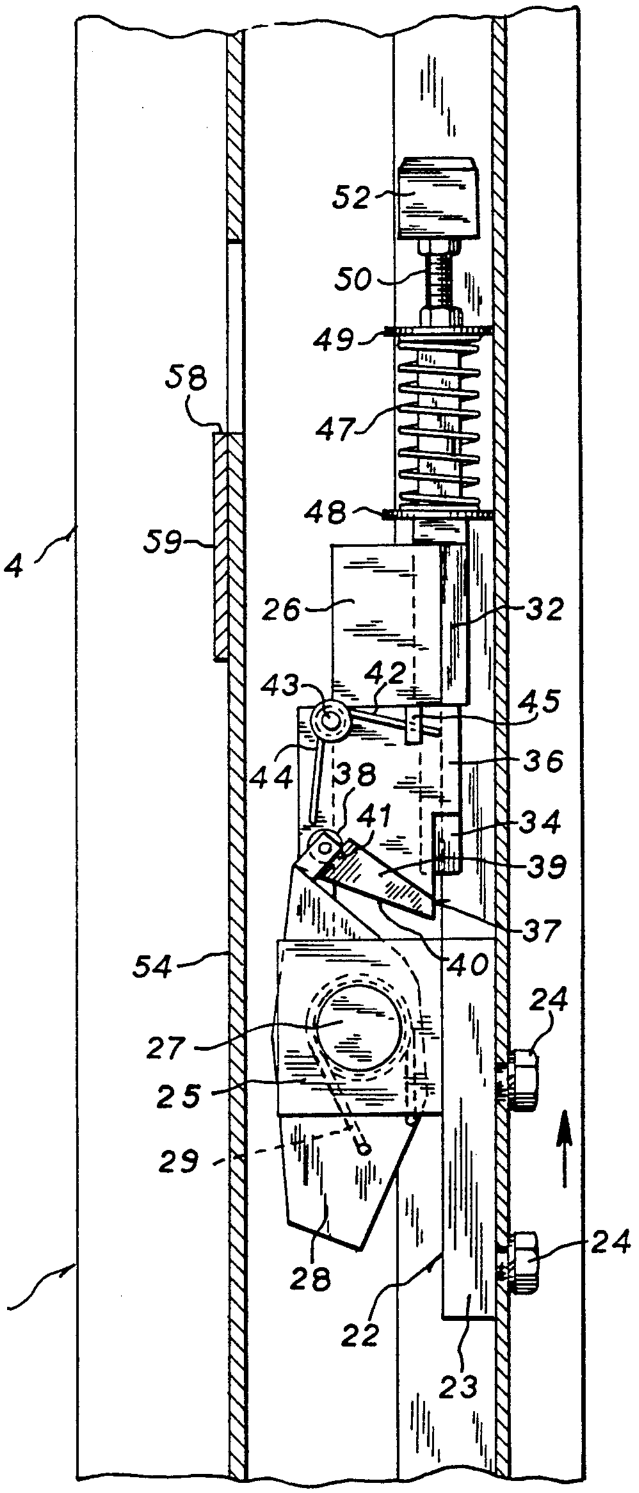

SAFETY MECHANISM FOR A VERTICAL RECIPROCATING CONVEYOR

BACKGROUND OF THE INVENTION

A vertical reciprocating conveyor is employed to move cargo between two or more different vertical levels.

The typical vertical conveyor includes a carriage having a platform to support the cargo and the carriage is guided for vertical movement between the lower and upper levels on a supporting structure or frame that includes a pair of spaced vertical columns. With a hydraulically actuated conveyor, one or more hydraulic cylinder units are each connected through a cable or chain mechanism to the carriage and through extension of the cylinder units, the carriage can be raised to the upper level. To lower the carriage, operation of the pump motor of the hydraulic system is terminated and valving is actuated to permit discharge of the hydraulic fluid from the cylinder units and consequent controlled lowering of the carriage.

A typical mechanically operated vertical conveyor utilizes an electric motor that is connected through a chain drive to the carriage. Operation of the reversible motor will act to raise and lower the carriage.

As a safety feature, the typical vertical conveyor includes an overload protection mechanism which will sense an overload on the carriage, as the carriage is elevated, and terminate operation of the drive system. However, the conventional overload protection mechanism only senses an overload when the carriage is moved upwardly and will not sense an overload when the carriage is at an upper level and is moved downwardly.

The conventional vertical conveyor is dependent solely on the lift mechanism to support the carriage at the upper level. Because of the natural elasticity of either the cable or chain, which connects the drive unit to the carriage, and due to the flexing of the hydraulic hoses in a hydraulically operated conveyor, the carriage may move as such as an inch and one half as it is loaded or unloaded at the upper level. To deal with this problem, many hydraulically operated vertical conveyors incorporate a pressure switch to stop operation of the hydraulic pump motor when the carriage is at its upper level. The pressure switch builds pressure within the hydraulic system, thereby significantly reducing the stretch of the lifting cables or chains and the flexing of the hydraulic hose. However, the pressure which is built up through use of the pressure switch bleeds off in a relatively short period of time, either because of oil leaking past the hydraulic cylinder seals or the oil leaking through the check valve, so that after the pressure is bled off, the floating condition will reappear.

A second problem encountered with the use of a pressure switch is that the switch must be set to deal with the maximum load to be placed upon the carriage. This means that the actuation of the switch occurs only when the system reaches full pressure and this full pressure condition will increase the wear on the lifting system.

It has been recognized that the unintentional descent of the carriage from an upper level can create a severe safety hazard. Unintentional descent of the carriage can be the result of overloading the carriage, either intentionally or inadvertently, beyond its rated capacity. An overload condition can occur when heavy material handling equipment, such as a fork lift truck, is run onto the carriage. If, for example, a fork lift truck, in placing a load onto the elevated carriage, drives onto the carriage, the load can be increased by a factor of two or three.

Unintentional descent of the carriage from an upper level can also occur as a result of inadequate maintenance. While most vertical conveyors require little day-to-day maintenance, situations may occur where the conveyor may be given no maintenance, with the result that components may fail, resulting in an unintentional descent of the carriage.

A further cause of unintentional descent may result from repair or maintenance work being done on the conveyor, in which the carriage at the upper or second level is used as a maintenance platform. If, during the repair or maintenance, a critical part of the unit is removed, the platform could descent unintentionally resulting in injury to the maintenance personnel.

In the past, attempts have been made to include a safety mechanism with a vertical conveyor to provide a degree of protection against uncontrolled descent of the carriage. In general, these prior mechanisms sense either excess descent speed, or failure of the lifting mechanism. The limitation of the speed sensing mechanisms is that they do not "fail safe", and their function can only be assured through regular testing. The safety mechanisms that sense failure of the lift mechanism are generally responsive to breakage of the cable or chain, which connects the drive unit to the carriage. The connecting cable or chain normally passes over a series of sheaves to provide a mechanical advantage and if the rupture of the cable or chain occurs a substantial distance from the carriage, a considerable length of cable or chain must play out before the safety mechanism is actuated.

SUMMARY OF THE INVENTION

The invention is directed to a safety mechanism for automatically locking a vertical conveyor at an elevated or upper level, to thereby prevent uncontrolled descent of the carriage. The conveyor comprises a carriage having a platform adapted to support a load or cargo, and the carriage is guided for vertical movement on a supporting structure or frame that includes a pair of spaced vertical columns. The carriage is moved between the lower and upper levels by a drive mechanism which preferably consists of one or more hydraulic cylinders which are mounted on the supporting frame and which are connected through a cable and sheave arrangement to the carriage.

The safety mechanism of the invention includes a pair of locking bars that are mounted on opposite sides of the carriage and are adapted to engage ledges or abutments on the vertical columns of the supporting frame when the carriage is at an upper or elevated level. As the carriage moves upwardly it passes slightly beyond the upper level to a higher position and actuates a limit switch on the supporting frame. Actuation of the limit switch terminates operation of the pump motor of the hydraulic system and actuates the valving to permit the hydraulic cylinders to lower the carriage. At the higher position, the locking bars are moved from a retracted or released position to a locking position so that the locking bars can engage abutments on the vertical columns as the carriage moves downwardly from the third higher position to the upper level.

To move the carriage from the upper or second level back down to the lower level, the cylinder units are actuated, causing the carriage to move upwardly from the second level to the third higher position and again actuate the limit switch to terminate operation of the pump motor, thus enabling the carriage to lower. Simultaneously, the locking bars are moved from the locking position to the release position, so that the carriage can then descend through the upper level back to the lower level.

More particularly, the locking bars are pivotally connected to opposite sides of the carriage and are biased outwardly to the locking position where they can engage the abutments on the respective columns of the supporting frame. When the carriage is at the lower level, a follower on each locking bar is engaged with a projection or holding member on a slide that is movable relative to the carriage, and the engagement of the follower with the projection holds the locking bar in the released or retracted position.

When the carriage is elevated slightly above the upper level to the third position, the slide on the carriage engages a stop which moves the slide downwardly relative to the locking bar, thereby moving the projection out of engagement with the follower and permitting the locking bar to pivot outwardly to the locking position under the influence of the biasing mechanism. As the carriage then lowers from the third position to the upper level, the locking bars will engage the abutments on the columns to hold the carriage at the upper level.

In moving the carriage downwardly from the upper level back to the lower level, the cylinder units are activated causing the carriage to rise slightly above the upper level to the third position, thus bringing each slide into engagement with the respective stop. The engagement of the slide with the fixed stop causes the slide to lower relative to the locking bar and as the slide is lowered, a cam surface on the slide engages the locking bar follower to pivot the locking bar inwardly and bring the follower into engagement with the projection on the slide, thereby holding the locking bar in the released or retracted position. With the locking bars in the released position, the carriage can then freely descend through the upper level and back to the lower level.

The invention can also incorporate an overload protection mechanism which will sense an overload condition on the carriage as the carriage is elevated to discontinue operation of the drive mechanism. With the construction of the invention, the carriage, when at the upper level, must initially go up before it can go down, and therefore, if the carriage is overloaded, the overload load protection mechanism will sense the overload condition as the carriage is moved upwardly from the upper level to discontinue operation of the drive and prevent the locking bars from moving to their released position. Thus, the invention will automatically retain the overloaded carriage at the upper level and prevent uncontrolled descent of the carriage.

As the carriage, when at the upper level, is not supported by the drive mechanism, but instead is supported by the locking bars, the carriage is stabilized against lateral shifting movement relative to the supporting frame. Further, engagement of the locking bars with the supporting frame, will prevent downward float of the carriage as load or cargo is applied to the carriage.

Due to the fact that the carriage is positively locked at the upper level, pressure switches, as used in the past, in hydraulically operated vertical conveyors are eliminated and this substantially reduces potential wear to the lifting system.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of a vertical reciprocating conveyor incorporating the safety mechanism of the invention;

FIG. 3 is an enlarged fragmentary vertical section of the safety mechanism with the carriage being shown at a position beneath the upper level;

DESCRIPTION OF THE ILLUSTRATED EMBODIMENT

Figure 8:
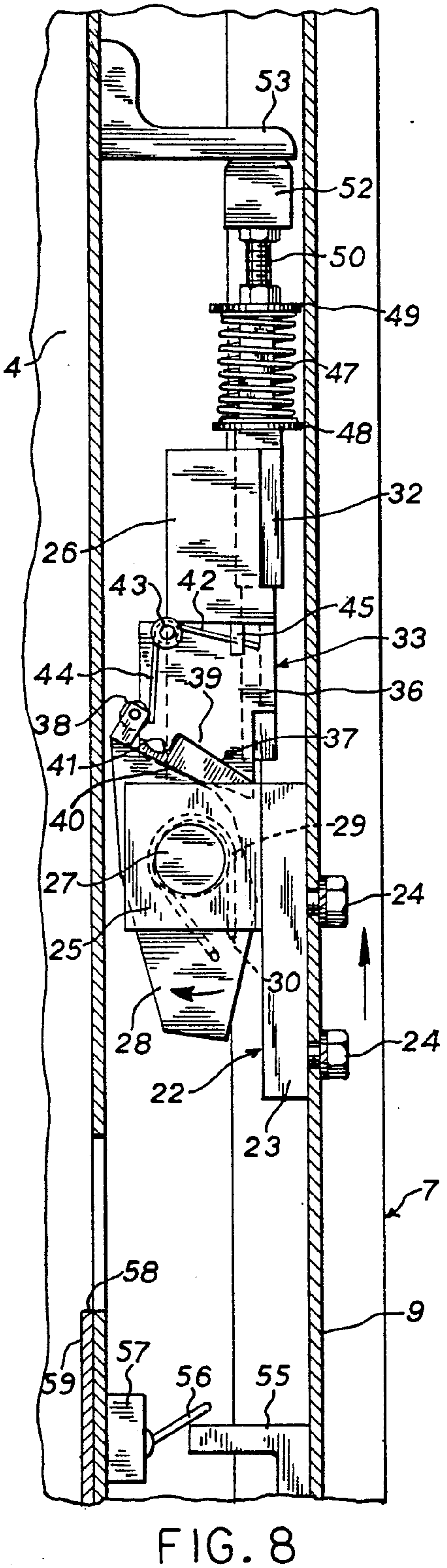
FIG. 8 is a view similar to FIG. 3 showing the carriage at the third position and the locking bars in the released or retracted position.

FIG. 1 shows a vertical reciprocating conveyor 1 which is adapted to convey cargo between a lower level 2 and an upper level 3 of a building.

Conveyor 1 includes a supporting frame that consists of a pair of spaced vertical columns 4. The upper ends of columns 4 can be stabilized by braces 5 that connect the columns with the wall 6 of the building.

A carriage 7 is adapted to move vertically relative to columns 4 between the lower level 2 and upper level 3. Carriage 7 includes a generally flat platform 8 that is adapted to support the load or cargo and side frames 9 extend upwardly from opposite sides of platform 8. The upper ends of side frames 9 are connected by a cross brace 10. In practice, protective gates, not shown, are mounted on the open sides of the carriage.

Figure 2:
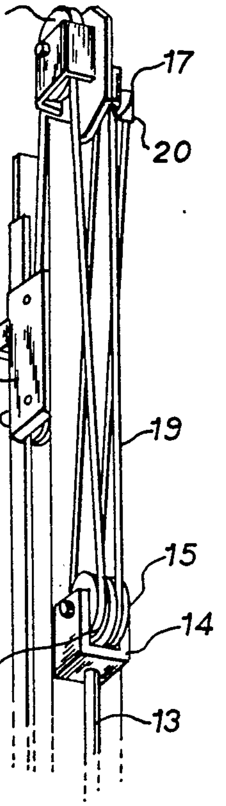
FIG. 2 is an enlarged perspective view of the cable and sheave arrangement.

Carriage 7 is moved between the lower level 2 and upper level 3 by a drive mechanism which, as illustrated, comprises a pair of hydraulic cylinder units 11. Each unit Il includes a cylinder 12 which is connected to a column 4 and a piston rod 13 is slidable in each cylinder 12. The piston rods 13 of cylinders 12 are connected to opposite sides of frame 9 of carriage 7 through a cable and sheave arrangement. As seen in FIG. 2, a double clevis 14 is mounted on the upper end of each piston rod 13 and a pair of sheaves 15 and 16 are mounted for rotation on clevis 14. In addition, a pair of sheaves 17 and 18 are mounted on the upper end of each column 4. One end of a cable 19 is dead-ended on the column 4, as indicated by 20, and the cable then passes downwardly around sheave 15, upwardly around sheave 17, downwardly around sheave 16, upwardly around sheave 18, and is attached to a wheel block 21 mounted on side frame 9 of carriage 7. Each wheel block 21 includes a series of rollers, not shown, which are adapted to ride on the inner surface of column 4 to guide the carriage 7 in vertical movement.

A safety mechanism is associated with each side frame 9 of carriage 7 and is adapted to lock the carriage at the upper level 3 and prevent uncontrolled descent of the carriage in case of an overload. Each safety mechanism comprises a frame 22 which, in turn, includes a plate 23 that is connected to the respective side frame 9 of carriage 7 by bolts 24. Projecting outwardly toward column 4 from plate 23 are parallel vertical plates 25 and 26, and a shaft 27 is connected between the plates.

Mounted for pivotal movement on shaft 27 is a locking bar 28 and the lower end of the locking bar is biased outwardly toward the web portion of column 4 by a torsion spring 29 which is mounted on shaft 27. One end 30 of the torsion spring 29 is engaged with plate 26, while the opposite end of the torsion spring engages the locking bar 28 so that the force of the spring will urge the lower end of the locking bar outwardly toward the column 4.

Figure 9:
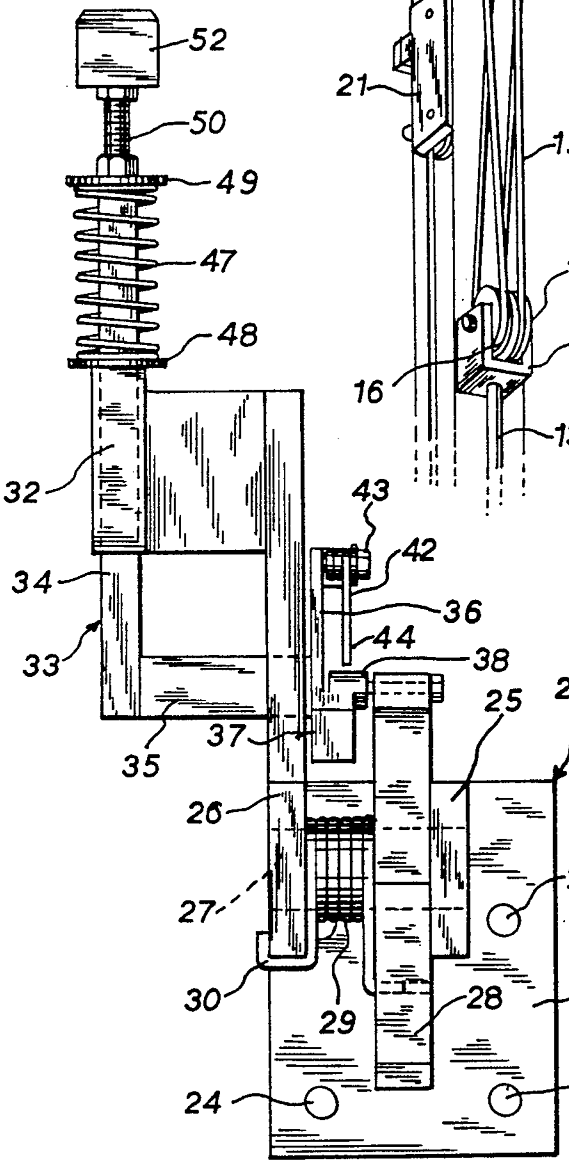
FIG. 9 is an end view of the structure shown in FIG. 3.

As best shown in FIG. 9, the upper end of plate 26 projects a substantial distance above the upper end of plate 25 and is connected to a tubular guide 32. A slide 33 is mounted for vertical sliding movement with respect to guide 32.

Slide 33 includes a vertical tube 34 which is slidable in guide 32 and the lower end of the tube 34 is connected through bracket 35 to a plate 36 which is parallel to plate 26.

Mounted on the outer surface of plate 36 is a cam 37 and a roller or follower 38, which is mounted for rotation on the upper end of lock bar 28 is disposed to engage cam 37, as will be hereinafter described. Cam 37 includes an upper cam surface 39, a lower cam surface 40 and a notch or abutment 41 which is located intermediate the cam surfaces 39 and 40.

Also mounted on the face of plate 36 is a spring 42. The central portion of spring 42 is attached to a pin 43 that projects outwardly from plate 36, while the free end 44 of spring 42 is located outwardly of notch 41, and the opposite end of the spring is fixed to the plate 36. This is accomplished by passing the end of the spring through a nut 45 which is mounted on plate 36.

Slide 33, which carries the cam 37, is biased upwardly relative to the frame 22 by a coil spring 47. The lower end of spring 47 is mounted on a seat 48 carried by guide tube 32, while the upper end of the spring bears against a collar or washer 49 that is mounted on the upper end of tube 34. Thus, the force of spring 47 will urge the slide 33 upwardly relative to the frame 22.

An adjusting bolt or rod 50 is threaded within the upper end of tube 34 and the outer end of the rod carries a pad 52. As the carriage 7 moves upwardly, as will be hereinafter described, pad 52 will engage a fixed stop 53 mounted on column 4, and this engagement will force the slide 33 downwardly relative to frame 22, against the force of spring 47.

OPERATION

When the carriage is at the lower level 2, the safety mechanism will be in the position shown in FIG. 3 in which slide 33 is in the upper biased position relative to frame 22 and follower 38 of locking bar 28 is engaged with notch 41 of cam 37, thus holding the locking bar in the released or retracted position where it is out of contact with the web 54 of column 4.

To move carriage 7 upwardly from lower level 2, the cylinder units 11 are actuated causing retraction of piston rods 13 and corresponding upward movement of the carriage. The system is designed so that the carriage 7 will move upwardly to a third higher position slightly above upper level 3, and at this level a projection or abutment 55 on the carriage will engage the arm 56 of a limit switch 57. Actuation of limit switch 57 will discontinue operation of the pump motor in the hydraulic system and also actuate the valving to permit flow of hydraulic fluid from the upper end of the cylinder. The weight of the carriage will then cause extension of the piston rods 13 to lower the carriage from the third position down to the upper level 3.

Figure 4:
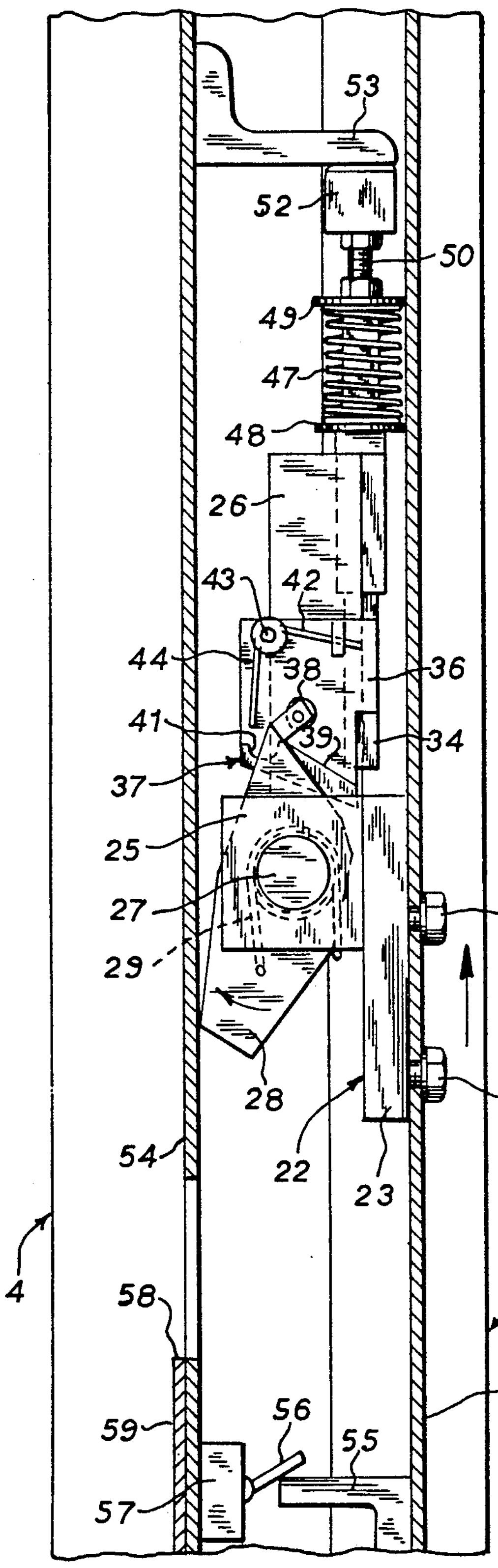
FIG. 4 is a view similar to FIG. 3 showing the carriage at a third position slightly above the upper level.

As the carriage approaches the third position, pad 52 will contact stop 53, thereby causing the slide 33 to move downwardly relative to frame 22. Downward movement of slide 33 correspondingly moves the plate 36 and cam 37 downwardly thereby releasing the follower 38 on lock bar 28 from notch 41, as shown in FIG. 4. With the follower 38 released from notch 41, the lower end of lock bar 28 will pivot outwardly toward column 4 under the influence of the torsion spring 29, and will ride against the web 54 of the column.

Figure 5:
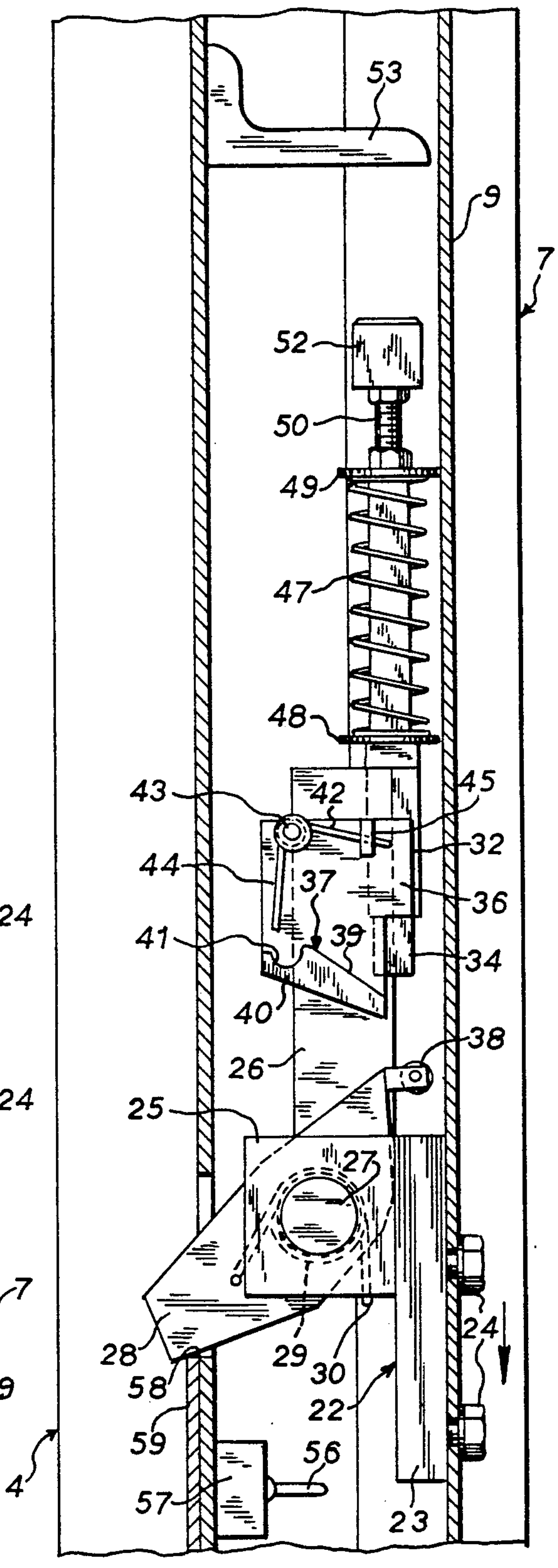
FIG. 5 is a view similar to FIG. 3 showing the carriage at the upper level with the locking bars engaged with the supporting frame.

FIG. 5 shows the carriage as it is lowered from the higher third position to the upper level 3. In this position, the follower 38 has ridden off the low end of upper cam surface 39 enabling the lock bar 28 to be pivoted to its locking position by spring 29 where the end of the lock bar pivots through the opening in web 54 and the lower edge of the lock bar engages a ledge or abutment 58 in the web 54. The rear edge of the lock bar 28 engages the outer surface of plate 23 to hold the lock bar in the locking position. With the lock bar 28 engaged with the abutment 58, the carriage is locked at the upper level 3, as illustrated in FIG. 5.

The abutment 58 is defined by an auxiliary plate 59, which is welded to web 54 of column 4. As the openings in the webs 54 of the columns are not made with close tolerances, the plates 59 can be welded to the columns 4 after the columns are installed to ensure that the upper edges of the plates 59 of both columns, which define the abutments 58, are at the same vertical level.

Figure 6:
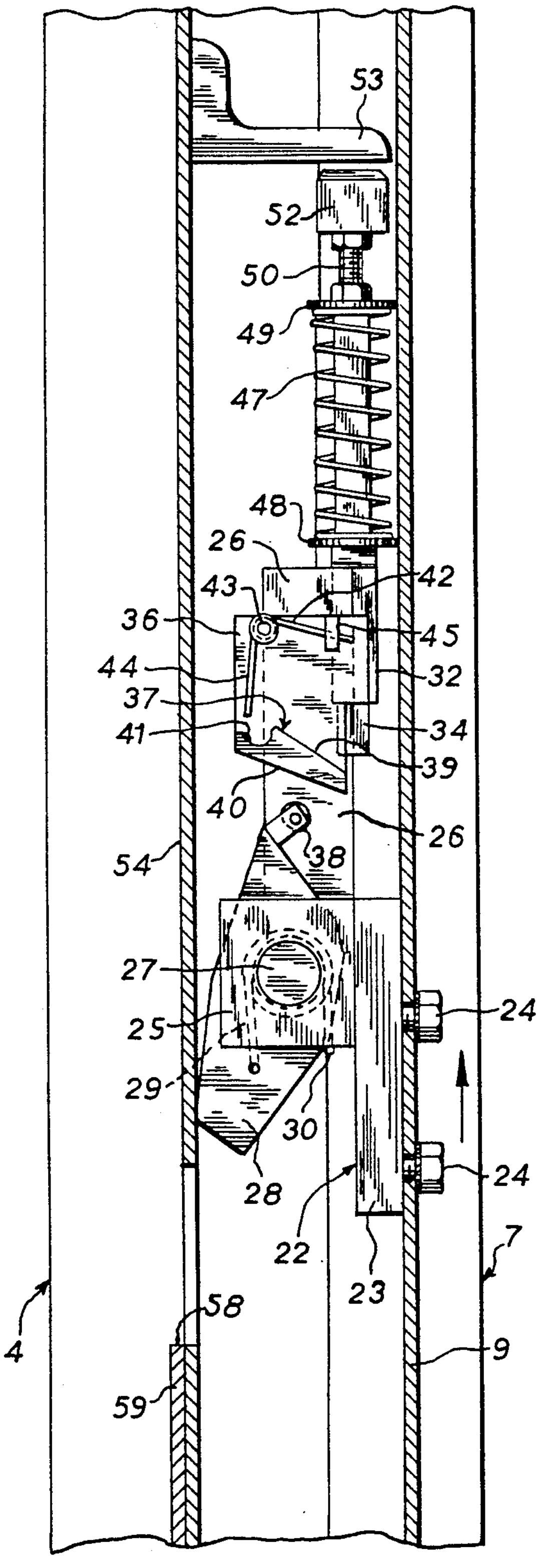
FIG. 6 is a view similar to FIG. 3 showing the carriage as it is moved upwardly from the upper level.

When it is desired to return the carriage 7 to the lower level 2, cylinder units 11 are again actuated causing carriage 7 to rise to the third position, slightly above upper level 3. As the carriage moves upwardly from the upper level, as shown in FIG. 6, lock bar 28 is released from the abutment 58 and the end of the lock bar rides against the web 54 thus pivoting the lower end of the lock bar inwardly, as shown in FIG. 6. At this time, follower 38 is spaced beneath the lower cam surface 40 of cam 37.

Figure 7:
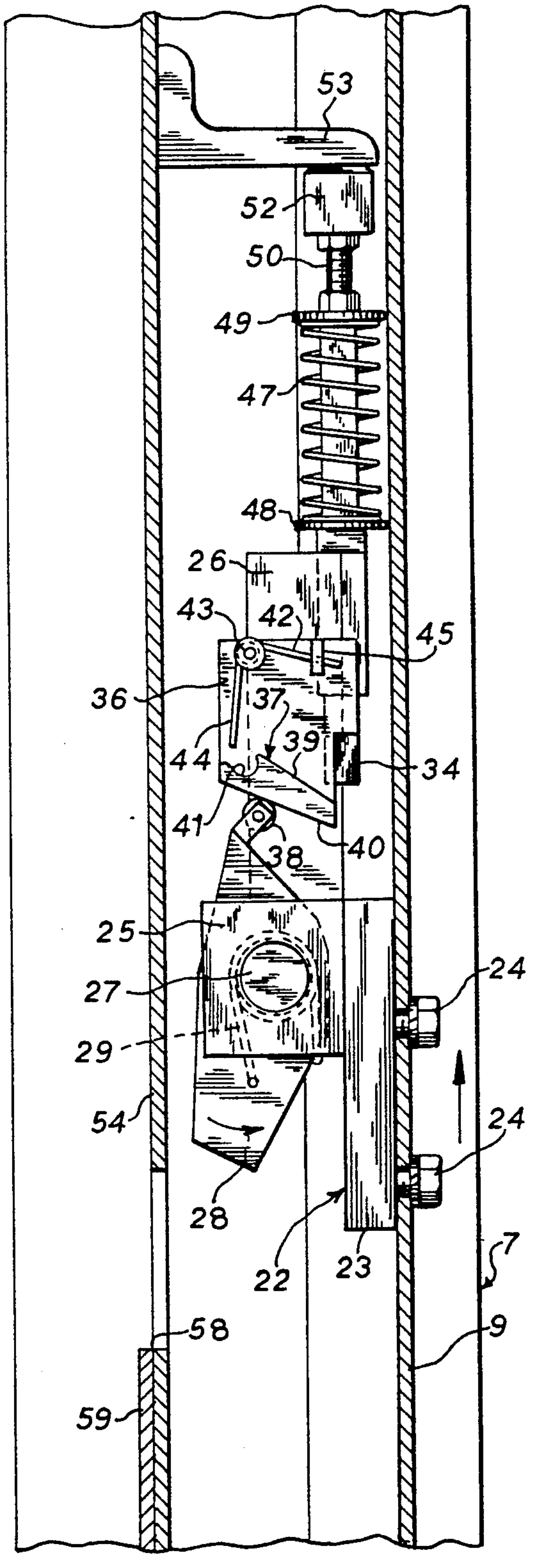
FIG. 7 is a view similar to FIG. 3 showing the carriage at a position approaching the third higher position.

Continued upward movement of the carriage from the upper level causes the pad 52 of the slide to engage stop 53 thereby moving the slide 33 downwardly relative to frame 22, as shown in FIG. 7. Downward movement of slide 33 causes the lower cam surface 40 to engage follower 38, thereby pivoting the lower end of the lock bar 28 inwardly away from web 54, as seen in FIG. 7.

When the carriage reaches the higher or third position, limit switch 57 will again be actuated to terminate operation of the pump motor and enable the carriage to lower. In this third position, slide 33 has been moved downwardly relative to frame 22, and the force of spring 29 will move follower 38 over the end of cam 37 and into notch 41. The engagement of follower 38 with notch 41 will hold the lock bar in the released or retracted position. The free ends 44 of spring 42 aid in guiding the follower into engagement with notch 41 and prevent the follower from overriding the notch. FIG. 8 shows the structure just before the follower 38 drops into notch 41 and the follower is engaged with end 44 of spring 42.

As the lock bar 28 is then held in its retracted position, the carriage can be lowered past the upper level 3 and back to the lower level 2 without the lock bar 28 engaging the abutment 58.

The invention can also incorporate a standard overload protection mechanism in the hydraulic system, which will sense an overload condition on the carriage, as the carriage is elevated, to discontinue operation of the pump motor. As the carriage 7, when at the upper level 3, must initially "up" before it can go "down" to the lower level 2, the overload protection mechanism will sense an overload as the carriage is moved upwardly from the upper level and thereby discontinue operation of the drive and prevent locking bars 28 from moving to the retracted position. Therefore, if the carriage is subjected to an overload condition at the upper level, the invention will automatically retain the overloaded carriage at the upper level and prevent uncontrolled descent. Similarly, the locking bars will prevent uncontrolled descent of the carriage in the event of a failure of the drive mechanism, or in the event components of the drive system are disconnected during repair or maintenance.

The engagement of the locking bars 28 with the abutments 58 also aid in stabilizing the carriage against lateral shifting as cargo is loaded or unloaded from the carriage 7 at the upper level. In addition, engagement of the locking bars with the abutments will prevent downward float of the carriage as cargo is applied to the carriage platform at the upper level 3.

While the drawings show a hydraulic drive system, it is contemplated that other drive mechanisms can also be used, such as an electric or hydraulic motor operating through a chain drive. Similarly, the mechanism can also be incorporated with vertical conveyors that move to two or more upper levels.

Various modes of carrying out the invention are contemplated as being within the scope of the following claims particularly pointing out and distinctly claiming the subject matter which is regarded at the invention:

I claim:

1. A vertical conveyor, comprising a supporting structure, a carriage adapted to support cargo and movable relative to said supporting structure from a first lower level to a second upper level, drive means for moving said carriage between said lower and upper levels, locking means disposed to interconnect said carriage and said supporting structure and movable between a locking position and a release position, retaining means for retaining said locking means in the release position when said carriage is at said lower level, actuating means for moving said locking means from the release position to the locking position when said carriage is at said upper level, means operable as a consequence of upward movement of said carriage from said upper level to a third position above said upper level for moving said locking means to the release position to enable said carriage to be moved downwardly to said first level, and means responsive to movement of said carriage from said lower level to said third position for releasing said retaining means to thereby enable said locking means to move to said locking position and thereby lock the carriage to the supporting structure as the carriage descends from said third position to said upper level.

2. The conveyor of claim 1, and including biasing means for biasing said locking means toward the locking position.

3. The conveyor of claim 1, wherein said locking means comprises a locking member pivotally connected to said carriage, said supporting structure includes an abutment disposed to be engaged by said locking member when said locking member is in the locking position.

4. The conveyor of claim 1, and including means for discontinuing operation of said drive means when said carriage is moved to said third position.

5. The conveyor of claim 1, wherein said drive means comprises a hydraulic cylinder unit having a retracted condition and an extended condition, said carriage being at said lower level when said cylinder unit is in an extended condition and said carriage being at said third position when said cylinder units is in the retracted condition.

6. A vertical conveyor, comprising a supporting structure, a carriage adapted to support cargo and movable relative to said supporting structure from a first lower level to a second upper level, drive means for moving said carriage between said lower and upper levels, locking means to interconnect said carriage and said supporting structure and movable between a locking position and a release position, retaining means for retaining said locking means in the release position when said carriage is at said lower level, actuating means for moving said locking means from the release position to the locking position when said carriage is at said upper level, means operable as a consequence of upward movement of said carriage from said upper level to a third position above said upper level for moving said locking means to the release position to enable said carriage to be moved downwardly to said first level, said retaining means comprising a movable member mounted for movement relative to said carriage, and holding means on said movable member and disposed to engage said locking means to retain said locking means in the released position.

7. The conveyor of claim 6, and including means for moving the movable member relative to the carriage when the carriage reaches said third position, to thereby move said holding means out of engagement with said locking means.

8. The conveyor of claim 7, and including adjusting means operably connected to said movable member for adjusting the position of said holding means relative to said carriage.

9. A vertical conveyor, comprising a supporting structure, a carriage adapted to support cargo and movable relative to said supporting structure from a first lower level to a second upper level, drive means for moving said carriage between said lower and upper level, locking means mounted on said carriage and movable between a locking position and a release position, a slide mounted for movement on said carriage between a first position and a second position, holding means disposed on the slide and disposed to engage said locking means when said slide is at said first position to hold said locking means in said release position, stop means on said supporting structure and disposed to be engaged by said slide when the carriage is moved from the lower level above said upper level to a third location to thereby move said slide from said first position to said second position and release said holding means to enable the locking means to move from the release position toward the locking position, and abutment means on said supporting structure and disposed to be engaged by said locking means when said carriage is moved downwardly from said third location to thereby lock the carriage at the upper level.

10. The conveyor of claim 9, and including biasing means for biasing said locking means to the locking position.

11. The conveyor of claim 10, and including second biasing means for biasing the slide to the first position.

12. The conveyor of claim 9, wherein said abutment means comprises a ledge on said supporting structure bordering the bottom of an opening in said supporting structure.

13. The conveyor of claim 9, and including cam means on said slide, a follower mounted on said locking means and disposed to engage said cam means, said cam means being constructed and arranged to pivot said locking means as said slide is moved between said first and second positions.

14. The conveyor of claim 13, wherein said cam means includes a first cam surface and a second cam surface, said first cam surface disposed to be engaged by said follower as said slide moves from said first position to said second position and said second cam surface disposed to be engaged by said follower as said slide moves from the second position to the first position.

15. The conveyor of claim 14, wherein said holding means comprises an abutment disposed between said cam surfaces.

16. The conveyor of claim 12, wherein said abutment comprises a notch disposed between said cam surface, said conveyor also including a spring disposed on said slide for guiding said follower into said notch.

17. The conveyor of claim 9, and including overload sensing means for sensing an overload on said carriage when said carriage is moved upwardly and operable to discontinue operation of said drive means.

18. The conveyor of claim 9, wherein said drive means comprises a hydraulic system including a cylinder unit.

19. The conveyor of claim 18, and including overload sensing means for sensing a predetermined increase in pressure in the hydraulic system when the carriage is moved upwardly with a predetermined overload, said overload sensing means constructed and arranged to discontinue operation of said hydraulic cylinder.

20. A vertical conveyor, comprising a supporting structure, a carriage adapted to support cargo and movable relative to said supporting structure from a first lower level to a second upper level, drive means for moving said carriage between said lower and upper level, locking means mounted on said carriage and movable between a locking position and a release position, biasing means for biasing the locking means to the locking position, means for discontinuing operation of said drive means when said carriage is moved to a third location above said upper level to enable said carriage to move downwardly from said third location, a slide mounted for movement on said carriage between a first position and a second position, holding means disposed on the slide and disposed to engage said locking means when said slide is at said first position to hold said locking means in said release position, stop means on said supporting structure and disposed to be engaged by said slide when the carriage is moved from the lower level above said upper level to said third location to thereby move said slide from said first position to said second position and release said holding means to enable the locking means to move from the release position toward the locking position, abutment means on said supporting structure and disposed to be engaged by said locking means when said carriage is moved downwardly from said third location to thereby lock the carriage at the upper level, means responsive to upward movement of the carriage from said upper level to said third location for moving said locking means to the released position to enable the carriage to move downwardly through said upper level to said lower level.

21. A vertical conveyor, comprising a supporting structure, a carriage movable relative to said supporting structure from a first lower level to a second upper level and to a third level slightly above said upper level, drive means for moving said carriage from said lower level to said upper level and to said third level, means activated by movement of said carriage from said lower level to said third level for discontinuing operation of said drive means whereby said carriage will descend by gravity to said upper level, locking means for locking the carriage to said supporting structure when said carriage descends to said upper level, and means activated by upward movement of said carriage from said upper level to said third level on actuation of said drive means for moving said locking means to a release position to thereby permit said carriage to descend from said third level to said upper level to said lower level.

22. A vertical conveyor, comprising a supporting structure, a carriage movable relative to said supporting structure from a first lower level to a second upper level and to a third level slightly above said upper level, drive means for moving said carriage from said lower level to said upper level and to said third level, locking means for locking the carriage to said supporting structure, said locking means being constructed and arranged to be in a release position as said carriage is moved from said lower level to said upper level and to said third level, means activated by movement of said carriage to said third level for discontinuing operation of said drive whereby said carriage will descend by gravity to said upper level, and means activated by descent of said carriage from said third level to said upper level for moving said locking means to the locking position whereby said carriage will be held at said upper level.

23. The conveyor of claim 22, and including means activated by movement of said carriage from said upper level to said third level on actuation of said drive means for moving said locking means to the release position whereby the carriage can descend from said third level to said upper level to said upper level.

24. The conveyor of claim 22, and including overload sensing means for sensing an overload on said carriage when said carriage is at said upper level and supported on said locking means, said overload sensing means being operable to prevent movement of said locking means to said release position.

25. A vertical conveyor comprising a supporting structure including a pair of vertical columns extending from a first lower level to a second upper level, each column having an abutment disposed adjacent said upper level, a carriage mounted for movement on said columns from said first lower level to said second upper level, drive means for moving the carriage between said lower and upper levels, locking means disposed on opposite sides of said carriage, each locking means having a release position where said locking means will not interfere with movement of said carriage on said columns and a locking position wherein said locking means extends laterally from said carriage in a position to engage the respective abutment, means on said supporting structure and engageable by the carriage when said carriage is moved to a third level slightly above said second level for discontinuing operation of the drive means to permit the carriage to descend by gravity from said third level to said upper level, means activated by movement of the carriage from the third level to the upper level for moving the locking means from the release position to the locking position, whereby said locking means will hold said carriage at said upper level.

26. The conveyor of claim 25, and including means activated by upward movement of the carriage from the upper level to said third level for moving said locking means from the locking position to the release position to thereby enable said carriage to descend from said third level through said upper level to said lower level.

* * * * *

UNITED STATES PATENT AND TRADEMARK OFFICE

CERTIFICATE OF CORRECTION

PATENT NO. : 5,228,537

DATED : July 20, 1993

INVENTOR(S) : ROBERT H. PFLEGER

It is certified that error appears in the above-indentified patent and that said Letters Patent is hereby corrected as shown below:

Col. 9, Line 37, CLAIM 16, Cancel "12" and substitute therefor ---15---; Col. 10, Line 57, CLAIM 23, Cancel "upper", second occurrence, and substitute therefor --lower--

Signed and Sealed this

Sixth Day of September, 1994

Attest:

BRUCE LEHMAN

*Attesting Officer*

*Commissioner of Patents and Trademarks*